Nov. 14, 1961 A. F. PARIS 3,008,613
SWEATER SIZING AND SHAPING MACHINE
Filed July 16, 1957 6 Sheets-Sheet 2

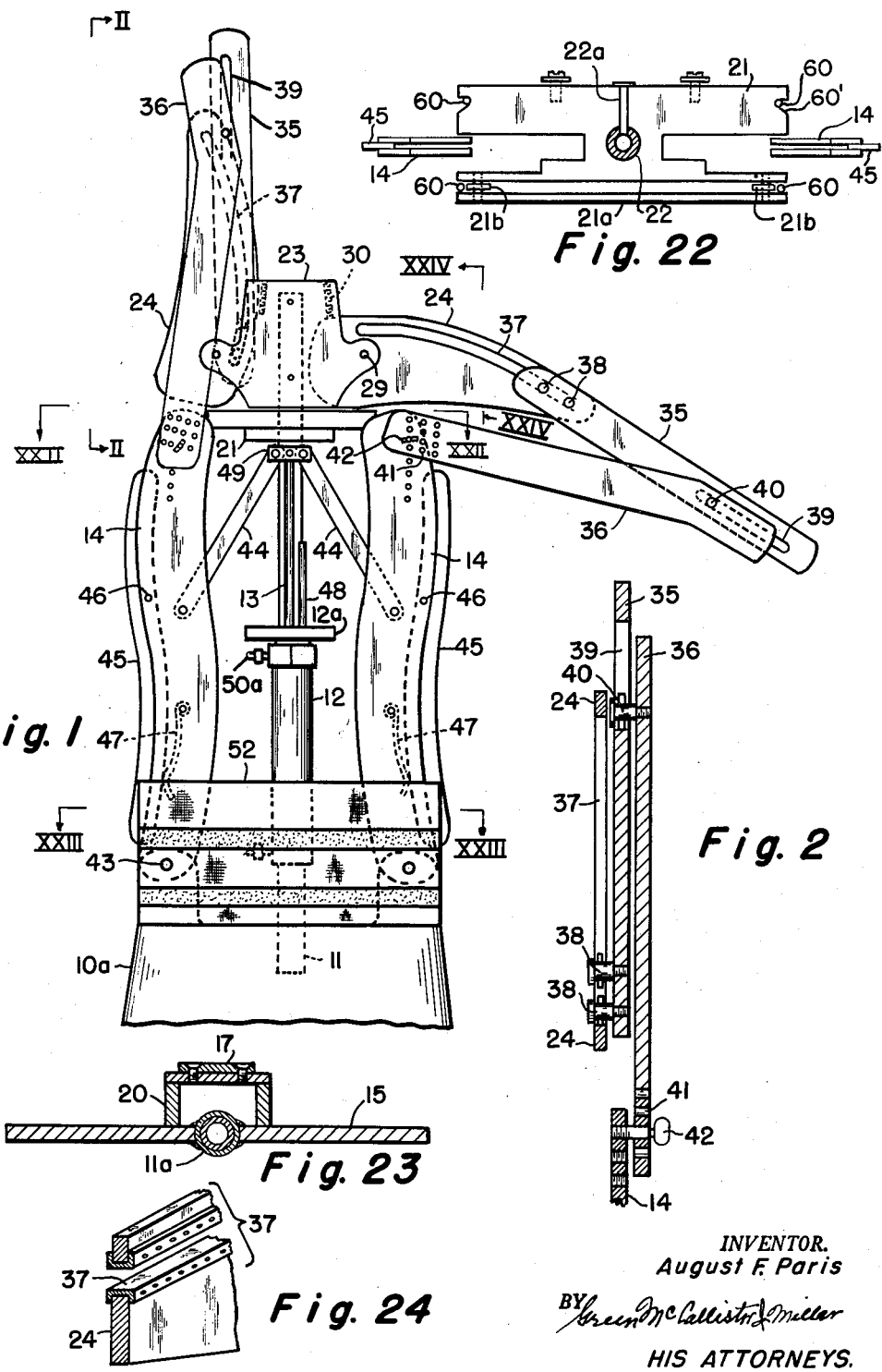

INVENTOR.
August F. Paris
BY
HIS ATTORNEYS

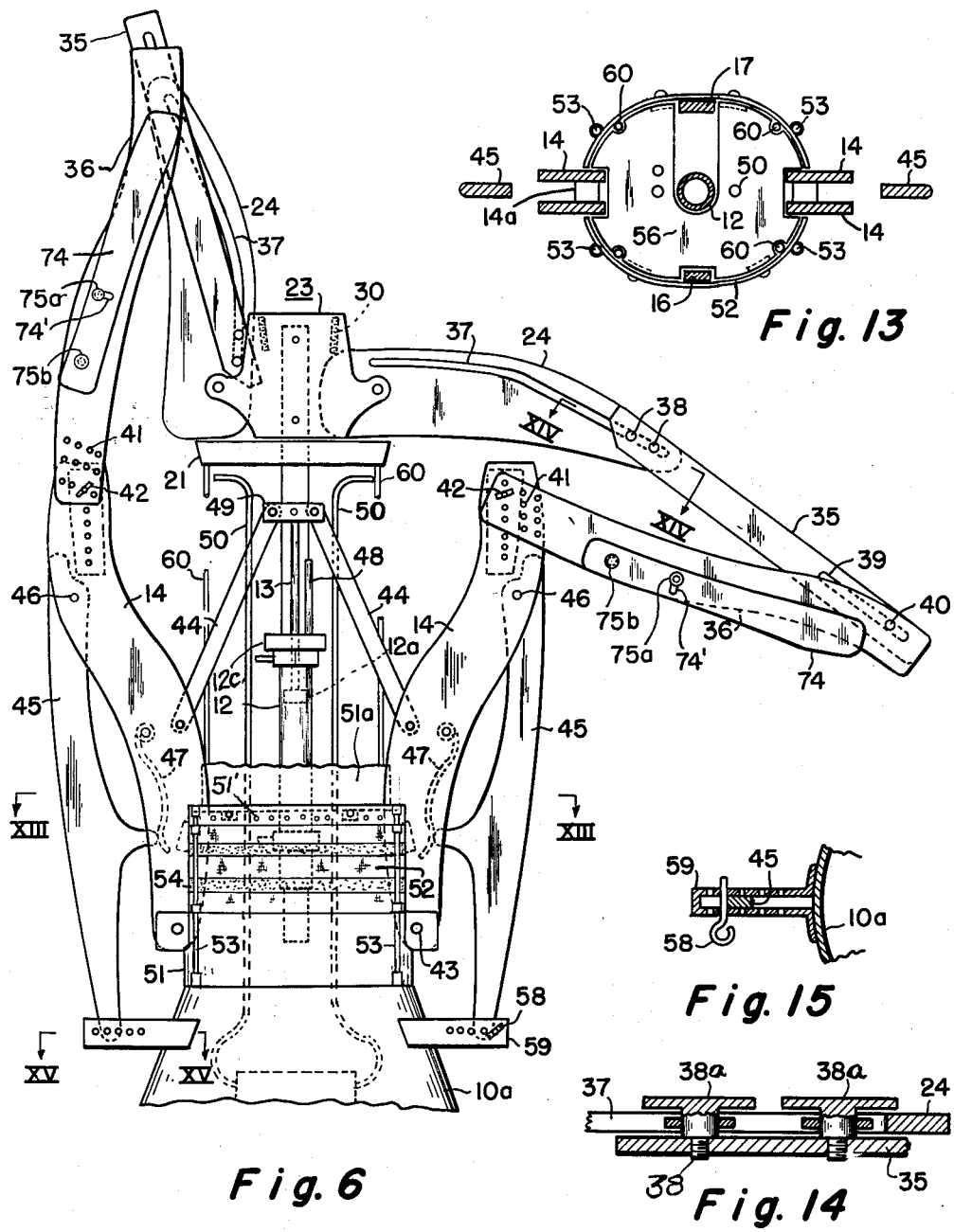

Nov. 14, 1961 A. F. PARIS 3,008,613
SWEATER SIZING AND SHAPING MACHINE
Filed July 16, 1957 6 Sheets-Sheet 4

INVENTOR.
August F. Paris
BY
HIS ATTORNEYS

Nov. 14, 1961 A. F. PARIS 3,008,613
SWEATER SIZING AND SHAPING MACHINE
Filed July 16, 1957 6 Sheets-Sheet 5

INVENTOR.
August F. Paris
BY
HIS ATTORNEYS

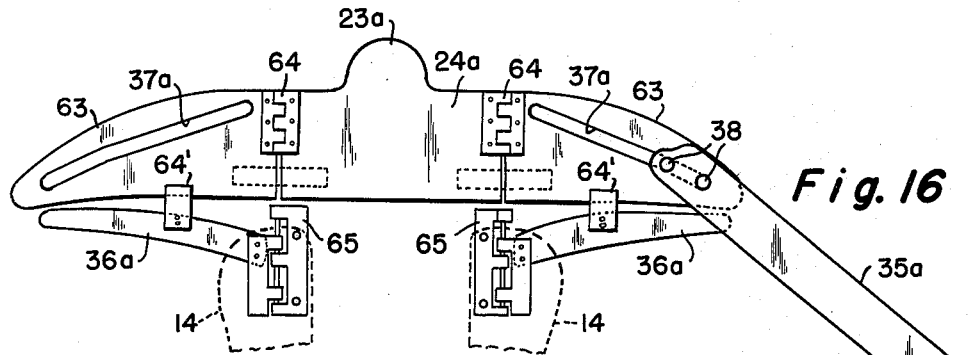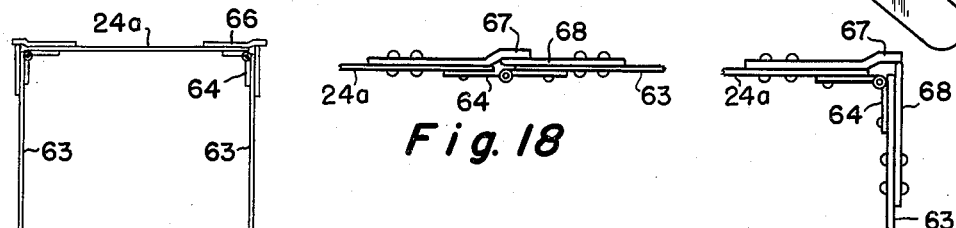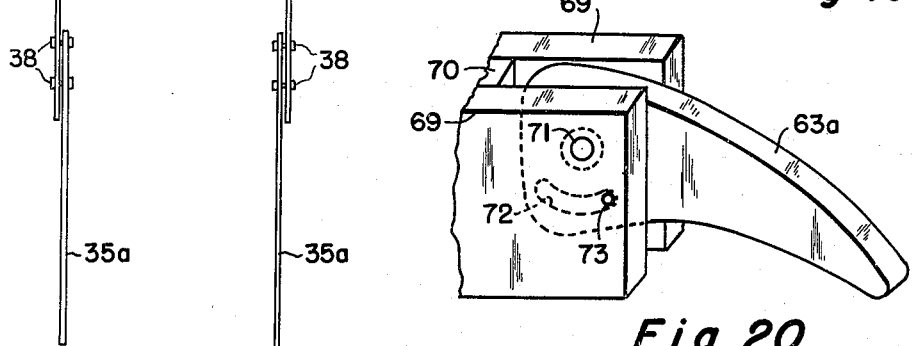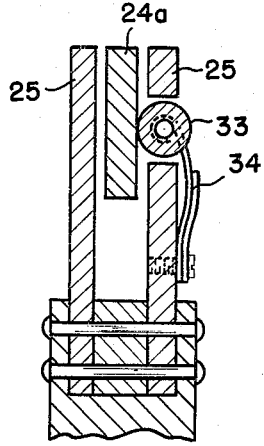
INVENTOR.
August F. Paris
HIS ATTORNEYS

United States Patent Office

3,008,613
Patented Nov. 14, 1961

3,008,613
SWEATER SIZING AND SHAPING MACHINE
August F. Paris, Oak St., Brockway, Pa.
Filed July 16, 1957, Ser. No. 672,224
15 Claims. (Cl. 223—69)

This invention relates to processing and sizing procedure and apparatus primarily adapted for use in the processing of knitted garments, hereinafter referred to as "sweaters."

An object of the invention is to produce procedure and apparatus for flat processing sweaters to remove wrinkles therefrom and, at the same time, restore all parts of the sweater, viz., the body portions, the armholes, the sleeves, and the neck portions to their original and intended size and shape.

A further object is to produce apparatus for flat finishing sweaters and for removing wrinkles therefrom while maintaining on each sweater a natural surface finish free from marks such as are often produced by contact with hot pressing surfaces.

A further object is to reduce a method of processing a sweater to remove wrinkles therefrom and to size and shape it, which consists in subjecting the fabric of the sweater to a flow of steam and a subsequent flow of air, each passing from the interior thereof outwardly through the fabric while the body portion and the sleeve portions of the sweater are mechanically subjected to wrinkle-removing and shaping tension.

A further object is to subject the fabric of the body portion and the sleeve portions of a sweater to just enough tension to remove wrinkles therefrom and to properly size and shape the same and, while maintaining such tension, subjecting the interiors of the body and sleeve portions to a charge of steam followed by a charge of air under pressure to thereby moisten and then dry the fabric.

A further and more specific object of the invention is to preliminarily subject portions of the fabric of a sweater to sufficient tension to remove wrinkles therefrom by yieldingly engaging the interior of the body of the sweater along lines on opposite sides thereof and below the sleeve openings and spreading the same laterally while each sleeve portion is simultaneously engaged throughout its length and is also spread laterally from the upper to the lower side thereof. While said portions of the fabric are so engaged and held under sufficient tension to remove wrinkles therefrom, successive or overlapping charges of steam and air, both under pressure are so delivered to the stressed fabric as to pass through the same and thereby first heat and moisten the stretched and wrinkle-free fabric, and then dry the same.

A further object is to produce a sweater shaping and sizing machine equipped with means for delivering a charge of steam and a charge of air to the interior of a sweater and also equipped with means for subjecting fabric portions of the sweater to mechanically applied shaping and sizing tension as a preliminary to the delivery of steam and air.

These and other objects are attained by means of a process hereinafter described and a machine designed and equipped to carry out the process by subjecting portions of the fabric of a sweater to wrinkle-eliminating tension and, while such fabric is so retained under such tension, subjecting portions thereof to a flow of steam followed by or overlapped by a flow of air in which both the steam and air pass through extended portions of the fabric.

In the drawings accompanying and forming a part of this application FIGURE 1 is a fragmental front view of a pressing machine for use in the processing of sweaters having long sleeves, structural parts of the machine are omitted for convenience of illustration.

FIGURE 2 is a fragmental sectional view of a sleeve-supporting portion of the machine as viewed from line II—II of FIGURE 1.

FIGURE 6 is a fragmental view of a machine such as shown in FIGURE 1, the sleeve supporting portions on one side thereof are shown elevated and the machine is equipped with replaceable parts such as may be employed in the operation of processing sweaters of different sizes and shapes.

FIGURE 13 (Sheet 3) is a diagrammatic sectional view along the line XIII—XIII of FIGURE 6.

FIGURE 14 is a fragmental sectional view taken along the line XIV—XIV of FIGURE 6.

FIGURE 15 is a fragmental sectional view along the line XV—XV of FIGURE 6.

FIGURE 16 (Sheet 6) is a fragmental view of a modified form of machine in which parts of the shoulder-supporting portion are hinged so that such parts and the sleeve supporting portions are capable of being swung forwardly as a preliminary to placing a sweater on and removing it from the machine.

FIGURE 17 is a diagrammatic view showing the positions of the sleeve-supporting portions and the hinged portions of the shoulder supports when the sleeve-supporting portions are swung forwardly as a preliminary to placing a sweater on or removing it from the machine.

FIGURES 18 and 19 are fragmental views of a portion of the apparatus shown in FIGURES 16 and 17.

FIGURE 20 is a fragmental view of a machine illustrating means which may be employed in supporting and positioning a shoulder-engaging part of a machine such as illustrated in FIGURES 1 and 3.

FIGURE 21 is a sectional view along the line XXI—XXI of FIGURE 9.

FIGURE 22 (Sheet 1) is a sectional view as if taken along the line XXII—XXII of FIGURE 1, the arm portions of the apparatus being omitted for convenience of illustration.

FIGURE 23 is a fragmental view taken along the line XXIII—XXIII of FIGURE 1; and FIGURE 24 is a fragmental sectional view along the line XXIV—XXIV of FIGURE 1.

Figure 4:
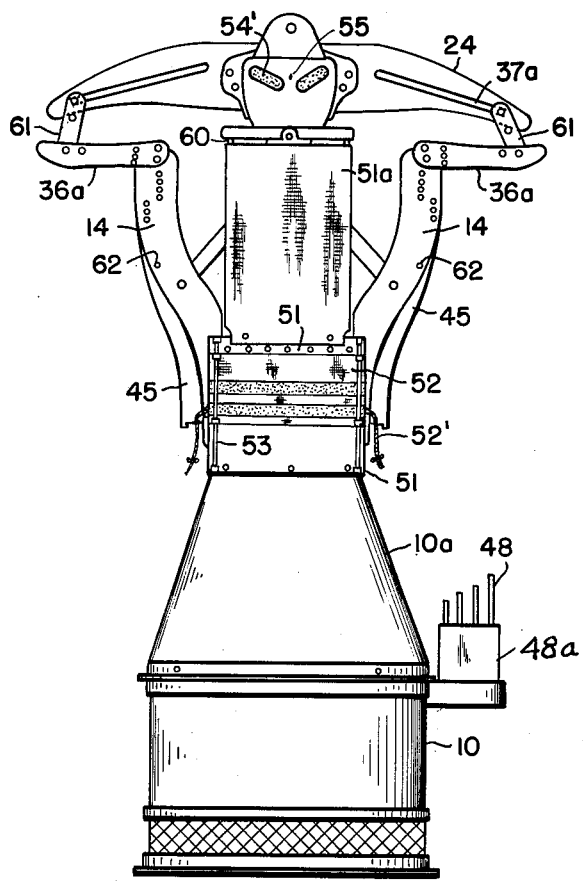
FIGURE 4 is a front elevation of a machine embodying my invention and equipped to size and shape sweaters having short sleeves; the shoulder and body engaging portions of the machine are shown in the sweater-processing position.

By sizing and shaping I means restoring the fabric of each sweater processed to its original and intended shape and measurements. As to this, I have discovered that when the fabric of a knitted garment is stretched while heating and moistening steam is passed therethrough, and then, while still stretched, is completely dried by being subjected to a similar flow of drying air, the fabric will retain the shape and size to which it has been stretched. The moistening heat applied as indicated, renders the fabric soft and pliable and causes it to respond to such stretching tension as is applied to it.

The apparatus illustrated is a sweater processing and sizing machine on which the sweaters to be processed and sized are subjected to a charge of heating and moistening steam and then to the action of a charge of drying air. The steam and air are delivered to the interior of the sweater under sufficient pressure so that both pass through selected portions of the fabric included in the make-up of the body and sleeve portions of the sweater, while the same is subjected to sizing, shaping and wrinkle-removing tension.

Embodiments of my invention include what may be designated as a permanent base portion having a casing which may be either circular or oval in horizontal section. Like many garment finishing machines, the base portion of each of the machines illustrated, supports a post on which garments to be processed and finished are supported.

In the embodiments illustrated, the post is centrally located with relation to the casing and projects vertically above the upper edge of the casing. The base portion also is provided with means not shown, for delivering steam and air under pressure to the sweater being processed.

The present machine differs from the usual form of processing machine in that the wrinkle-removing tension, i.e., the lateral stretching applied to selected portions of the fabric of the sweater, is mechanically applied before the sweater is subjected to the moistening effect of a flow of steam. The tension so applied is preferably maintained until after the sweater has been completely dried. It is released prior to removing the sweater from the machine.

In the illustrated embodiments of the invention a garment support, i.e., a sweater support is mounted on the center post and is located at a predetermined distance above the upper edge of the casing of the base portion. This support may be, and preferably is adjustable toward and away from the base portion of the machine. In the various embodiments of the invention the sweater support is formed of several parts. These parts include shoulder supports which are located on opposite sides of a neck support portion. As illustrated the neck support is secured to the center post and is formed to support and shape the neck and adjacent portions of a sweater and particularly the body portion of the sweater located centrally of and immediately below the neck portion. Sleeve supporting and shaping members of the illustrated embodiments are secured to each shoulder portion and each shoulder support portion is movable relatively to the neck portion. The sleeve support members are also movable relatively to each other and to the neck support portion, all for the purpose of facilitating the placing of sweaters on and removing them from the machine.

Figure 3:
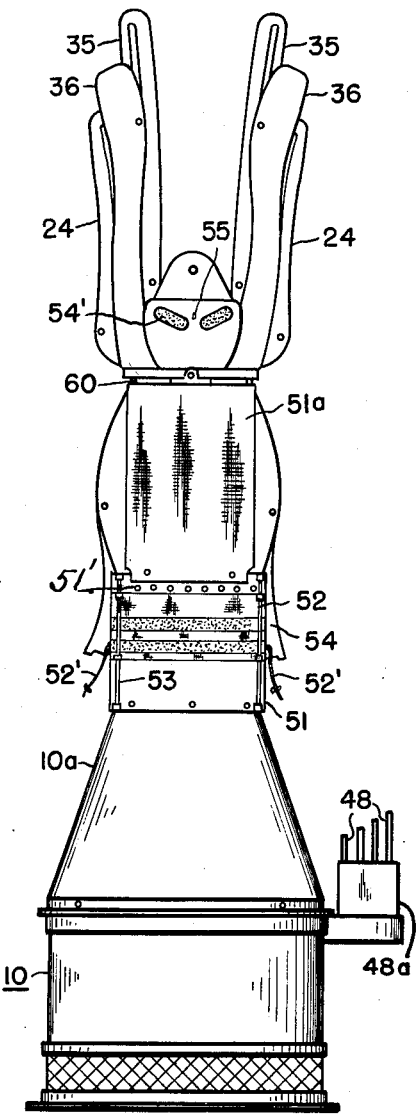
FIGURE 3 is a front elevation of a sweater pressing machine such as disclosed in FIGURE 1 but in which both of the sleeve-supporting portions thereof are raised to upright positions preliminary to placing a sweater on the machine for the purpose of processing the same.

The machines illustrated as embodiments of the invention are equipped with shoulder portions and sleeve supporting portions that are movable from a laterally extending position, as a preliminary to installing a sweater on the machine and also as a preliminary to removing a sweater from the machine. In the machine illustrated in FIGURES 1, 4 and 6, this movement is from the laterally extending position to an upright or vertical position as shown in FIG. 3. Sweaters are processed and sized while the shoulder and sleeve support portions are laterally extended and the arrangement is such that as those support portions are moved to the vertical positions, the sleeve portions move relatively to the shoulder portions for the purpose of decreasing the height to which a sweater must be raised in order to place it on, and later remove it from the machine.

A characterizing feature of my invention is that the processed and sized sweaters, when removed from the machine, are of the intended size and shape, are free of surface marking and are so creased laterally of the body and sleeve portions that they are capable of lying flat with the sleeve portions folded across the body portion while retaining the wrinkle-free condition of the fabric of which they are formed. Other characterizing features of the machines illustrated as embodiments of my invention include: (a) automatically actuated mechanisms for mechanically applying wrinkle-removing tension to selected portions of the fabric of a sweater as a preliminary to the application of other processing operations; (b) the use of replacement or substitute parts in equipping the machine so as to increase its effectiveness in the processing sweaters of different sizes and of different styles and shapes; (c) means for proportioning and directing the flow of steam and air pressure to different portions of the fabric of a sweater while the same is subjected to wrinkle-removing tension; (d) adjustable means for protecting portions of the fabric from the flow of processing steam; (e) means for holding portions of the sweater in fixed positions on the machine during the application of wrinkle-removing tension and during the delivery of processing steam and air to the interior of the sweater; (f) means for positioning the sleeve and shoulder supporting portions of the machine to facilitate placing each sweater on and removing the same from the machine; and (g) means for yieldingly applying the wrinkle-freeing tension to the fabric of each sweater, under conditions such that the processed and finished garment is capable of being flat-packed without in any way destroying the beneficial effect of the pressing operation.

Referring to the drawings and particularly to the embodiment of the invention disclosed by FIGURES 1, 2, 3, 6, 7, and 8, the sweater machine includes a base portion which is provided with a combination of cylindrical casing 10 and a superimposed conical casing 10a. As previously noted the base portion is equipped with means for delivering steam and also air under pressure to the interior of a sweater mounted on the machine. The base portion of the machine, like the base portion of the machine disclosed in my Patent No. 2,417,838 of March 15, 1947, is provided with a central post 11 which extends vertically above the upper edge of the casing 10a and includes in its make-up an operating cylinder 12 which also extends vertically. The cylinder 12 is provided with an operating piston 12a (FIGURE 7) to a piston rod 13 which also extends vertically above the cylinder and is operatively coupled to a pair of expander plates 14—14 which are pivotally connected at their lower ends to a transversely extending, fixed support bar 15, best shown in FIGURES 7, 8, and 23. The bar 15 is secured to a tubular part 11a which fits over and is secured to the center post at a point below the cylinder 12, see for example, FIGURES 1, 7, 8 and 23.

Figure 8:
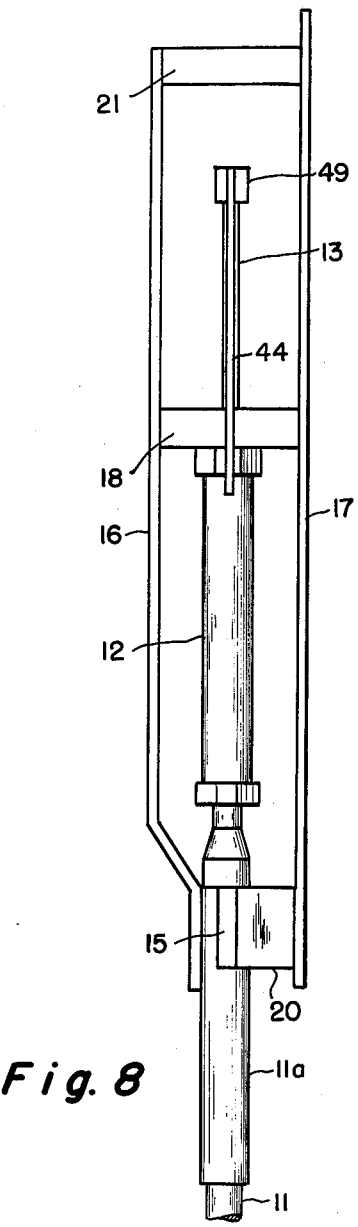
FIGURE 8 is a fragmental side elevation of a portion of the apparatus going into the make-up of a processing machine with portions of the operating parts removed for convenience of illustration.

As shown in FIGURE 8, the several parts of the center post are located between a front bar 16 and a rear bar 17. The front bar is secured at its lower end to the tubular part 11a which is included in the make-up of the center post. The bar 16 is so formed that the major portion thereof extends parallel to but is spaced from the cylinder 12. It is supported intermediate its length by a rectangular frame 18 which is located adjacent the upper end of the cylinder 12 and extends around the piston rod 13. The upper end of the bar 16 is secured to a plate 21, which may be referred to as a collar-support plate.

Figure 7:
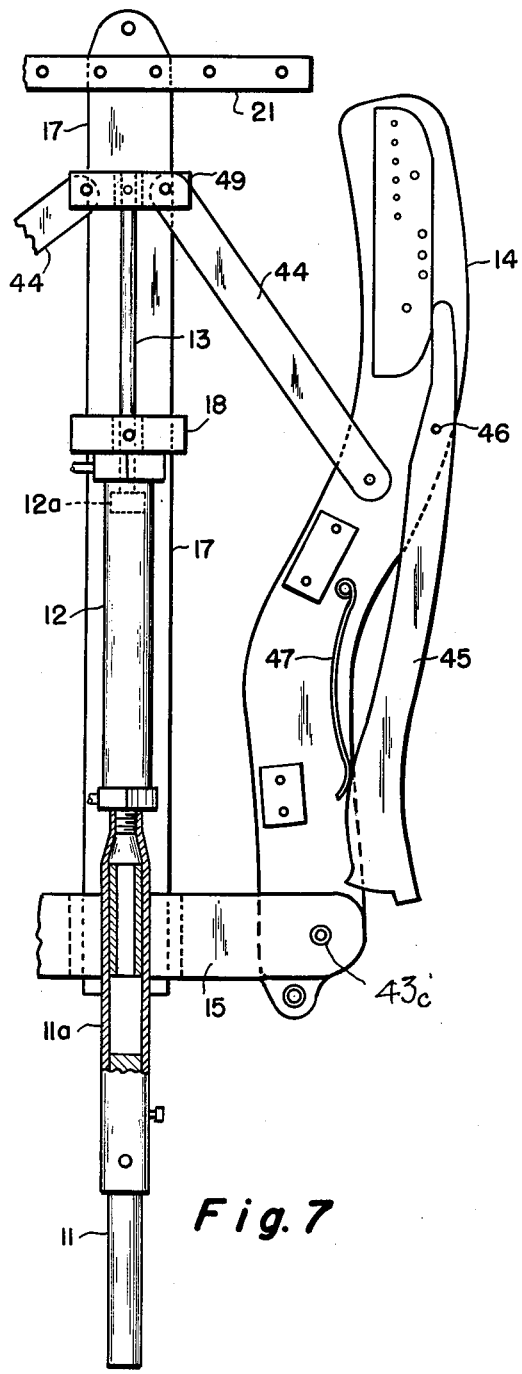
FIGURE 7 is a fragmental front view of a portion of the operating mechanism of a machine such as disclosed in FIGURE 1, and illustrates means such as is employed for subjecting the body portion of a sweater to tension prior to the delivery of moistening steam and drying air thereto.

The rear bar 17 extends parallel to the major portion of the front bar but is located at the rear of the center post and is spaced therefrom throughout its entire length. Intermediate its ends, the bar 17 is secured to the frame portion 18 and its upper end is secured to the plate 21. Its lower end is secured to a frame portion 20, clearly shown in FIGURES 8 and 23. The frame portion 20 is secured to the support bar 15 which, as shown in FIGURE 23, is formed in two parts with each such part secured to the tubular section 11a of the center post. As shown in FIGURE 7, the section 11a is, in effect, a socket portion, which engages and is clamped to the lower portion 11 of the center post which in turn is rigidly secured to the base portion of the machine and projects above the upper edge of the casing part 10a. In FIGURES 1 and 6 the front and rear bars 16 and 17 are omitted for clarity of illustration. In FIGURE 7 the front bar is omitted for the same reason.

As shown in FIGURE 22 (Sheet 1), the plate 21 supports an upwardly projecting socket member 22 which is aligned with the center post and is dimensioned to receive and secure in place a support pin 22a which constitutes a part of a collar portion illustrated in FIGURES 9 to 12.

FIGURES 1 and 6 disclose one embodiment of the collar and shoulder portions of the machine. As there shown, the collar portion 23 is located between and forms a support for the shoulder portions 24—24 which are located on opposite sides of the collar portion and each of which is pivotally secured thereto. The shoulder portions are capable of being swung from a laterally extending position such as shown in FIGURES 1 and 6, to a vertically extending position such as shown in FIGURE 3.

Figure 9:
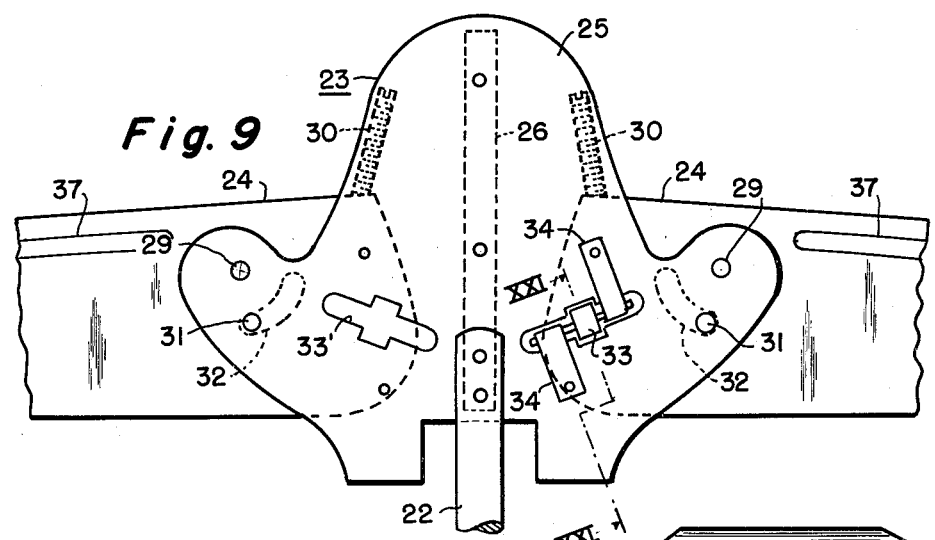
FIGURE 9 is a fragmental elevation of a portion of the upper part of the processing machine viewed from the front and discloses one form of a collar-supporting apparatus which may be employed as a part of a machine such as illustrated in FIGURE 1.
Figure 12:
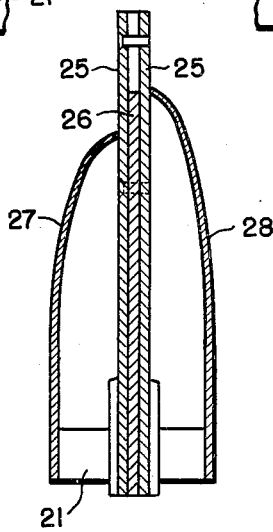
FIGURE 12 is a fragmental vertical sectional view showing the relative positions of portions of apparatus such as shown in FIGURES 10 and 11.

As illustrated in FIGURES 9–12, the collar portion 23 consists essentially of front and rear plates 25—25 of the shape shown in FIGURE 9, and separated one from the other by a spacer plate 26. A neck forming front plate 27, shown in FIGURES 10 and 12, overlaps the front plate 25 of the collar portion. The lower end of the plate 27 is secured to the support plate 21. A neck forming back plate 28 overlaps the greater portion of the rear plate 25 as shown in FIGURE 12, and is secured at its lower end to the rear edge of the plate 21 and also to the upper end of the rear bar 17, see FIGURES 8, and 11.

As shown in FIGURE 9, each shoulder support portion 24 is pivotally secured to the collar portion 25 by means of a separate pivot pin 29 which is carried by the plates 25—25 and extends across the space between them. Each shoulder portion 24 therefore projects into the space between the plate 25—25 and its movement around its pivot pin 29 is limited by spaced stops 30 and 31. Each of the two stops 30 is in the form of a screw which as shown in FIGURE 9 is located between the plates 25 and is engaged by thread-engaging portions formed in the inner faces of those plates. As a result, each screw is adjustable for the purpose of controlling the positions of the shoulder supports when they are in the extended position shown in FIGURE 9 and also at the right of both FIGURES 1 and 6.

Each of the stops 31 is in the form of a pin which is rigidly secured to the plates 25—25 and which bridges the space between those plates and passes through an arc-shaped slot 32 formed in the adjacent shoulder support 24, as shown in FIGURE 9. The cooperation between each pin 31 and the arc-shaped slot through which it extends, limits the upward movement of the shoulder portion 24 and determines the vertical position of the same when moved to the position FIGURE 3 and at the left in FIGURES 1 and 6.

The front plate 25 is also equipped with auxiliary means for frictionally engaging each shoulder portion and for holding it in the adjusted position. One such means is also illustrated in the sectional view of FIGURE 21 (Sheet 6). As there shown, it consists of a spring pressed friction roller 33 preferably carried by the forward plate 25. The roller is mounted on a shaft which is supported at its ends by spaced springs 34, one end of each of which is secured to the plate 25. The plate 25 to which the springs are secured, is slotted as shown by the open slot 33' at the left side of FIGURE 9, and the arrangement is such that each spring supported roller projects through a separate one of the slots 33' and frictionally engages the shoulder support 24 with which it cooperates, all as shown in FIGURES 9 and 21. While each roller 33 does not materially hamper the pivotal movement of the engaged shoulder support 24, it occasions sufficient friction to hold the shoulder portion in the vertical position shown in FIGURE 3, when it is moved to that position.

As shown in FIGURES 1 and 6, each shoulder support 24 cooperates with one of the expander plates 14 in supporting sleeve support members 35 and 36. Each shoulder support 24 is provided with a slot 37 which, as shown, is substantially parallel with the shoulder supporting edge of the support. Each sleeve supporting part 35 carries two roller-supporting pins 38 which are located in spaced relationship adjacent one end of the part 35, the arrangement being such that the rollers carried by the pins 38 are located in the slot 37 and cooperates therewith in positioning the part 35 relatively to the shoulder support 24, for all positions of the two members relatively to each other. Likewise, the end of the sleeve support member 35 opposite to the end carrying the pins 38, is provided with a longitudinally extending slot 39 which receives and cooperates with a roller carried by a pin 40 rigidly secured to the sleeve support member 36. The opposite end of the member 36 is shown as provided with three series of aligned and spaced apertures 41, one or another of which is adapted to receive a pin 42 capable of being secured in different positions to the adjacent expander plate 14. With such an arrangement the member 36, which may be termed the sleeve adjuster, is capable of moving with the expander plate 14 to which it is operatively connected, and is also capable of moving with and also relatively to the sleeve support member 35, which may be designated as the interconnector bar.

As previously described, each of the plates 14 is pivotally connected to an extension of the base portion by means of a pivot pin 43. Each plate 14 is also operatively secured to the piston rod 13 by means of a link 44 under conditions such that as the rod moves upwardly the upper ends of both plates 14 move inwardly and, conversely, as the rod 13 moves downwardly the upper ends of the plates move outwardly. During these movements of the plataes 14 the sleeve adjusters 36 move with the plates and at the same time relatively to the interconnector bars 35, due to the fact that the arm adjusters are operatively connected to the connector bars by means of slot and pin connections.

Each side expander plate 14 carries a replaceable adjuster bar 45 which is adapted to engage the interior of the body portion of a sweater along a line below one of the sweater armholes. The arrangement is such that the two adjuster bars engage opposite sides of the body of the sweater as the two plates 14 are moved outwardly by the action of the piston rod 13 and and link 44. As shown in FIGURES 1 and 7 each of the adjuster bars 45 is pivotally mounted on a separate one of the expander plates 14 by means of a pivot pin 46 located intermediate its ends and secured to the plate 14 at a point adjacent the outer edge thereof and intermediate its ends. As shown in FIGURES 1 and 7 the lower end portion of each adjuster bar 45 is yieldingly pressed outwardly by a leaf spring 47 which is carried by the cooperating plate 14.

As shown in FIGURES 3 and 4, each machine embodying my invention is provided with a number of separate pins 48 of different length to be used in controlling the throw of the piston included in the cylinder 12. For this purpose the cylinder is provided at its upper end with an apertured plate 12c for receiving and supporting a selected one of the pins 48 and as shown in FIGURES 1 and 6, the selected pin 48 mounted on the plate 12c extends vertically parallel to the piston rod 13 and engages a crosshead 49 carried by the rod 13 as it moves downwardly and in that way limit the downward movement of the piston and the crosshead 49 and the outward movement of the plates 14. As shown in FIGURES 1, 6, and 7 the upper ends of the links 44 which actuate the expander plates 14 are pivotally secured to the crosshead 49.

From the foregoing it will be apparent that each shoulder support 24 and the sleeve-supporting members 35 and 36 operatively secured thereto, may be moved to and from a vertical position such as shown in FIGURE 3, and that when each shoulder support is moved to a vertical position the sleeve support member 35 moves along the slot 37 to a position such that its then lower end is adjacent the collar support 23. Likewise the member 36 is turned from a substantially laterally extending position shown at the right of FIGURE 1, to the vertical position shown at the left of that figure and also in FIGURE 3, and all as a preliminary to placing a sweater on the machine.

As the two shoulder-supporting members 24 are turned or swung upwardly to the vertical position the sleeve-supporting members 35 and 36 have the effect of being shortened since they move downwardly relatively to the portions 24. As a result a sweater may readily and easily be placed on the machine with the sleeve thereof pulled downwardly over the upwardly projecting shoulder portions 24 and sleeve support members 35 and 36. As the shoulder portions are swung outwardly and downwardly to the laterally extended positions, the sweater neck engages the collar support 23 and the members 35 and 36 are moved outwardly so that the roller-carrying pins 38 of the member 35 move from the inner to the outer end of the slot 37. This movement is to some extent occasioned by the roller and slot connection between the member 35 and the member 36 which includes the roller carried by the member 36 and operating in the slot 39 formed in and extending longitudinally of the sleeve-support member 35. The above mentioned roller is mounted on the pin 40 secured to the member 36.

Figure 5:
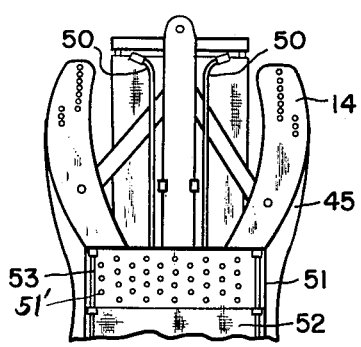
FIGURE 5 is a fragmental view of a sweater machine such as disclosed in FIGURES 1 and 4 in which portions of the apparatus are omitted for convenience of illustration.

It will be understood that the separate series of apertures 41 are formed in the sleeve-supporting member 36 for the purpose of adjusting the position of that member to accommodate different lengths of sleeves and also different diameters of armholes in sweaters processed on the machine. It will also be apparent that as the shoulder supports are moved from the vertical position to the laterally extending position, the varying relative positions of the shoulder supports 24 and the members 36 will have the effect of expanding the armholes of the sweater and of also placing the sleeve portions of the sweater under wrinkle-removing tension. In addition the outward movement of the expander plates in response to the downward movement of the piston rod 13, moves the sleeve support members 36 outwardly and upper portions of the sweater sleeves will be further extended laterally as a preliminary to delivering a charge of moistening steam to the interior of the sweater. In FIGURES 5 and 6 I have shown steam-delivery pipes 50 with their delivery ends turned outwardly so as to direct a flow of steam into the sleeve opening of a sweater mounted on the machine and supported by the laterally extended sleeve supported members 35 and 36.

As previously noted the base portion of machines embodying my invention are enclosed by the cylindrical casing portions 10 and conical portion 10a. FIGURES 3, 4, and 6 also disclose that the conical portion 10a of each machine is surmounted by a closure portion 51 which is cylindrical adjacent the lower end thereof, but which is open along each side to accommodate movement of the expander plates 14 and associated parts.

The part 51 is perforated throughout a substantial portion of the upper part thereof as shown in FIGURES 1, 3, 4, and 6. These perforations 51' permit the steam and air to pass into and through a portion of the sweater which surrounds the part 51. In order to protect the ribbing formed around the bottom of the sweater, from the passage of steam, I employ two baffle plates 52, one at the front and one at the rear of the machine and both movable up and down along the closure portion 51. The position of each baffle plate may be adjusted to accommodate the processing of sweaters of different lengths. Each baffle also covers a part of the perforations in the plates 52 and in that way prevents the passage of steam through the ribbing of sweater, thus avoiding permanent stretching of the ribbing and also preserving its elasticity.

As shown in FIGURES 6 and 13 of the drawings, each baffle plate is slidingly mounted on rods 53 which are located in spaced and parallel relationship, one pair at the front and one pair at the rear of the machine. Each rod 53 is secured to the part 51 of the machine and extends vertically of the machine so that the baffle 52 may be moved to different positions along it and in that way cover more or less of the perforations 51' formed in the part 51, and also to position it to accommodate the positioning on the machine of sweaters of different lengths. A separate nylon cord 52' is secured to each lateral edge of each baffle plate 52 adjacent lower end thereof to be used in adjusting the position of the baffle.

As shown, each baffle is provided with two parallel strips of "traction cloth" 54 which extend transversely thereof and is located in a position to engage the lower portion of the sweater. The traction cloth is perferably coated with fine emery powder so that it frictionally engages, and in that way holds the engaged portion of the sweater in place on the baffle plate and the machine.

Figure 10:
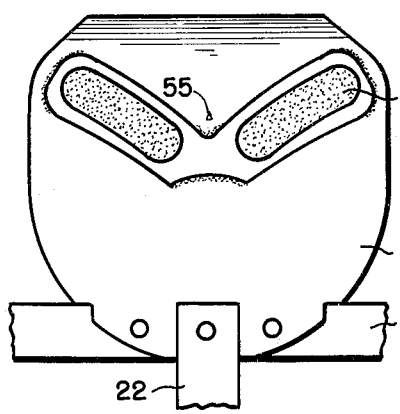
FIGURE 10 is a front view of a portion of a machine which may be employed in connection with the collar support, in positioning and supporting the upper portion of the front of a sweater.
Figure 11:
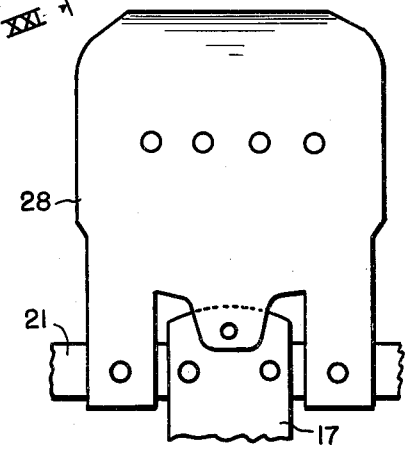
FIGURE 11 is a rear view of a portion of apparatus which may be employed in supplementing a collar-supporting portion such as shown in FIGURE 9.

As shown in FIGURES 3, 4, and 10 the front plate 27 forming a part of the collar support portion 23, is also provided with two strips of traction cloth 54'. In order to aid these strips in holding the upper front portion of each sweater in the desired position on the machine, each of the plates 27 is also provided with a forwardly projecting pin 55 which is positioned to pass through the upper portion of the sweater and positively holds that portion in place on the machine while the front portion of the sweater is pulled downwardly to adjust its length preliminary to subjecting it to the processing operation.

A horizontal extending partition 56 (FIGURE 13) is secured to the part 51 adjacent the upper edge thereof and extends transversely across the interior of the machine except for the fact that the center post passes through it and the partition is also formed to accommodate the movement of the expander plates 14 and the adjuster bars carried by those plates. The steam pipes 50 and the air delivery pipe 50a which communicates with the upper end of the cylinder 12 also pass through the partition.

As shown in FIGURE 13, the expander plates 14 may be made up of two plates separated by a spacer 14a and as a result one end of each sleeve support member 36 may project between the two plates and be pivotally secure thereto by means of a pin 42 such as illustrated in FIGURE 6. It will also be apparent that where the expander plates are so formed the portions of the adjuster bars 45 associated therewith, may project between the two plates and each bar may be pivotally secured to them, as previously described. In FIGURE 6 each expander plate is shown as provided with a leaf spring 47 which is arranged to engage and yieldingly force the lower portion of the associated adjuster bar outwardly. Such a spring is also shown in FIGURES 1 and 7. The spring shown in FIGURE 6 engages a nose formed on the associated bar 45 and the outward movement of the lower end of the bar is limited by a stop pin 58 which may be located in one or another of a line of apertures formed in a laterally extending bracket 59 shown secured to the portion 10a of the casing enclosing the base portion of the machine.

Separate nylon panels 51a are mounted at the front and back of the machine shown in FIGURES 3 and 4. Each such panel is secured at its lower end to the waist disclosure 51 and, as later described, is laterally supported by a pair of rods 60.

One of the functions of the nylon panels 51a is to check the velocity of the steam flow to the front and also to the rear of the sweater mounted on the machine. While each panel permits the passage of steam through it, it nevertheless prevents the pressure of the steam from bulging the front and rear of the sweater. The panels also direct the steam laterally so that the steam pressure tends to force the lateral portions of the sweater outwardly and in that way contribute to the delivery of steam and also air into the interior of the sleeves of the sweater.

Each panel 51a extends upwardly from the upper edge of the waist or closure portion 51 to the plate 21 which is located on the center support above the cylinder 12. As shown, each panel is carried by a pair of vertically extending, spaced, parallel rods (FIGURES 6 and 22); the lower ends of each of which are positioned in a separate socket secured to the inner face of the portion 51 adjacent to its upper edge. The upper end of each rod 60 is upported in a notch-like recess 60' formed in the plate 21. As shown in FIGURE 22, the rod receiving notches formed at the front of the plate 21 are located between the forward edge of the plate and a metal strip 21a. Spacers 21b between the plate 21 and the strip 21a contributes to the formation of two notch-like recesses each for receiving a rod 60.

The installation of each panel 51a and its removal from the machine is ready accomplished by merely tilting the upper ends of its mounting rods 60 and in that way removing them from the recess in which they are supported. After the upper ends are so removed, the lower ends of the rods are merely lifted out of their supporting sockets. The flexibility of the nylon of each panel 51a makes it possible to remove the upper end of one rod of each pair for its supporting notch.

In FIGURE 4, I have shown a front view of a machine for sizing and shaping short-sleeved sweaters. The machine there illustrated is similar in many respects to the machine illustrated in FIGURES 1, 3 and 6. It includes a base portion similar to the base portions of those machines. It also includes the casing 10—10a, the waist or closure portion 51, the baffle 52, the front and rear panels 51a and the shoulder supports 24. The only difference is in the sleeve-supporting elements. While the machine includes sleeve-support members 36a shorter, but similar to the sleeve adjuster members 36, it does not include sleeve-supporting elements such as the inter-connector bars 35. However, it does include short connector elements 61, each of which is pivotally secured at one end to one of the members 36a, the other end thereof is provided with a roller which is not shown but is movable along a slot 37a formed in one of the shoulder supports 24. The slot and roller connection is for the purpose of accommodating the relative movement of the parts 36a, 61 and 24 when the shoulder supports 24 are swung upwardly to a vertical position such as shown in FIGURE 3. During this movement of the parts, the shoulder supports 24 are swung upwardly by hand. This is usually accomplished when the expander plates 14 are swung inwardly by the operation of the plunger operating in the cylinder 12. As the shoulder parts move upwardly, each roller mounted on one of the connector bars 61 moves along the slot 37a in the shoulder support. This movement takes place as the shoulder supports are swung upwardly and each of the parts 61 moves the sleeve support member 36a around its pivotal connection with one of the expander plates 14. As a result both members 36a project upwardly when the shoulder supports are raised to the vertical position and the roller on each of the members 61 arrives at the then lower end of the slot 37 in which it is located.

With the parts in the positions described, a short-sleeved sweater may be readily mounted on the machine by projecting the shoulder supports 24 through the armholes of the sweater. After a sweater is in place on the machine, the shoulder supports are turned downwardly, with the result that the parts 36a and 61 then occupy the positions shown in FIGURE 4. As the expander plates 14 swing outwardly in response to the downward movement of the piston located in the associated cylinder 12 each member 36a cooperates with the shoulder support 24 to which it is secured, in stretching the armhole of the sweater an amount sufficient to smooth out such wrinkles as may exist in the neck portion of the sweater. The outwardly moving expander plates 14 remove the wrinkles from the body portion of the sweater and condition it for flat packing. As shown in FIGURE 4, a separate adjuster bar 45 is pivotally secured to each of the expander plates 14. The pivot connection is indicated at 62.

In FIGURE 4 each sleeve support member 36a is shown provided at the inner end with a number of pin receiving apertures and the upper end of each of the plates 14 is likewise provided with a number of such apertures for the purpose of adjusting the position of the member 36a relatively to the associated plate. The plurality of apertures formed in the other end of the member 36a are also for adjustment purposes. The lower end of the adjuster bar is yieldingly pressing outwardly by means of a spring such as the spring 47 shown in FIGURES 1 and 6.

It will be noted that a different form of adjuster bar is shown in each of the FIGURES 1, 4, 6 and 7. As previously stated, the adjuster bars are interchangeable for use in the processing and pressing of different sizes and shapes of sweaters. It is for this reason that I have illustrated different forms of expander bars. It will be also apparent that each such bar is self-adjusting by reason of the spring 47 which bears against it.

In FIGURE 16, I have illustrated a different form of shoulder support and also different forms of sleeve support members from those employed in the apparatus described. As shown in FIGURE 16 the neck portion 23a is an integral part of the shoulder support 24a. The opposite ends 63 of the support are shown hinged to the central and neck portion of the support. The hinge is designated by reference character 64. With such an arrangement the ends of each shoulder support may be swung forwardly as a preliminary to mounting a sweater on the machine. In FIGURE 17, I have diagrammatically illustrated the end portion 63 in the forward position.

Each end portion is provided with a slot 37a which extends from the free end thereof toward the hinge 64 and a separate sleeve support member 35a is secured to each end portion 63 by a slot and roller connection, i.e., a set of spaced rollers is located at one end of each member 35a. Each roller of the set is mounted on a pin 38 secured to the member 35a and operates in the slot 37a of a separate one of the end portions 63.

The portion of the machine shown in FIGURE 16 also includes a sleeve support member 36a which is pivotally secured to a bracket 64' carried by the end support 63. Each of the members 36a is also pivotally secured to a separate one of the two expander plates 14 by means of a hinge 65. With this arrangement the separate sleeve support members secured to each of the end portions 63 are capable of swinging back and forth with the end portions 63 so that they either extend forwardly as indicated in FIGURE 17 or extend laterally as shown in FIGURE 16.

In FIGURES 18 and 19, I have shown enlarged views of one of the hinges 64 in connection with spring latches 66 which are adapted to hold the end portions 63 in the laterally extended positions but which are also of such form as to readily permit the associated end portions to be swung to the forward position. Each latch 66 consists of a keeper 67 formed of spring steel and shown secured to the central portion of the shoulder support 24a, and a latch member 68 which is secured to the end portion 63. The cooperation between the latch and keeper is such that the portion 63 is firmly held in the extended position and also in the forward position.

In FIGURE 20 I have shown a form of shoulder support which may be employed in machines embodying my invention. As there shown the central portion of the shoulder support which corresponds to some extent to the central portion 24a of FIGURE 16, is formed by spaced plates 69 which are held in spaced relationship by spacer blocks 70, one only being shown as a fragmentary part. The end portion 63a is located between the plates 69 and is pivotally mounted on a pivot pin 71 which extends from one plate 69 to the other. As shown, the shoulder support 63a is provided with an arc-shape slot 72 through which a pin 73 extends. The pin 73 is carried by the plates 69 and cooperates with the slot so as to limit the movement of the shoulder support 63a as it is swung upwardly to a vertical position and as it is moved to the laterally extended position shown in FIGURE 20.

While some changes may be made in the structural details of the apparatus illustrated and described without departing from the spirit and scope of my invention, I note that the procedure employed in the operation of each machine illustrated consists in mounting a sweater on the machine, then delivering actuating air pressure to the cylinder 12 so as to move the piston rod 13 downwardly to thereby swing each of the expander plates 14 outwardly, so that adjuster bars 45 carried by the expander plates yieldingly engages opposite sides of the interior of the sweater at points below the armholes. See FIGURES 4, 6, and 7. This movement of the plates 14 also shifts the position of the sleeve support members 36 or 36a as the case may be. The movement of these members yieldingly stretches the armholes and also places wrinkle-removing tension on the material going into the make-up of the sweater sleeves.

While the expander plates are in the outer position, I then deliver a flow of saturated steam to the interior of the body portion and the sleeve portions of the sweater. This flow is continued for a short time and is followed by a flow of heated air which is also delivered to the interior of the sweater. The delivery pressure of the steam and also of the heated air is such that the steam is caused to pass through at least selected portions of the sweater and the heated air also is caused to pass through corresponding portions of the fabric of the sweater. I preferably so deliver the heated air to the interior of the sweater that it overlaps the flow of steam. The air flow is continued after the steam flow has been shut off and until the fabric of the sweater is free of moisture. Before removing the thus processed and sized sweater from the machine, I so deliver air under pressure to the cylinder 12 that the piston rod 13 moves upwardly thus causing the expansion plates 14 to swing inwardly and relieve the body portion and also the sleeve portions of the sweater of the tension previously applied to them. The shoulder portions and also the sleeve support members are then swung upwardly in the case of machine such as illustrated in FIGURES 1, 3, 4, 5, and 6. On removing the sized sweater from the machine the machine is ready to receive another sweater to be processed and pressed.

As to machines including shoulder portions and sleeve support parts such as illustrated in FIGURE 16, the end portions of the shoulder supports are swung forwardly to the position indicated in FIGURE 17 as a preliminary to mounting a sweater on the machine and also as a preliminary to removing a sweater from the machine.

At the time the expander plates 14 of the machine are swung outwardly, the shoulder end supports are swung to the positions shown in FIGURE 16 and are retained in those positions during the delivery of both steam and air to the interior of the sweater.

In FIGURES 3 and 4 I have shown each of the machines equipped with a pin box 48a. Each box contains a number of pins 48 of different lengths. By mounting pins 48 of different length on the cylinder head as shown in FIGURES 1 and 6, the extent of the downward movement of the crosshead 49 can be varied and in this way the extent of outward movement of the plates 14 can be controlled and in that way adjusted to accommodate the processing of sweaters of different widths. Thus when a number of sweaters of the same size (length, width and shape) are to be sized and processed the operator selects a pin 48 of the proper length and places it in an operative position on the cylinder head of the cylinder 12, as shown in FIGURES 1 and 6. He also selects an adjuster bar 45 of the desired size and shape and adjusts the position of the baffle plates 52 to take care of the length of the sweaters. Where an adjuster bar 45 such as illustrated in FIGURE 6 is employed, he also adjusts the position of the pin 48 to limit the extent of the outward movement of the adjuster bar.

It will, of course, be apparent that such adjustments may be made and the machine may be so equipped for processing and processing a single sweater, but where a number of sweaters of the same style and size are to be sized and processed the operating time is minimized by adjusting and equipping the machine as described.

In FIGURE 6 I have shown the sleeve support members 36 equipped with what may be termed sleeve adjuster bars 74. Each bar is pivotally secured to a separate one of the members 36 by a pivot pin 75b. The pin passes through the upper end of the bar 74 as shown at the right of FIGURE 6, and is located adjacent the end of the support member 36 adjacent to one of the plates 14. I have also shown a pin 75a secured to the member 36 and extending into and through a slot 74' formed in the bar 74. With such arrangement the weight of the free end of the bar 74 tends to hold the bar in such a position that it is supported by the pivot pin 75b and the pin 75a. As a result, the weight of the free end of the bar 74 will aid in the processing and shaping of a sweater sleeve which surrounds and encloses the members 35, 36, and 74 during the processing of a sweater. One advantage gained by the use of the sleeve support bar 74 is that the machine is rendered equally efficient in the processing and pressing of long sweater sleeves and also sleeves of half or quarter length.

FIGURE 14 is a fragmental view of a shoulder support portion 24, and a member 35, and discloses the preferred positioning of the pins 38 and the preferred form of the rollers 38a journaled on the pins. As is apparent, the rollers 38a not only operate in the slots 37 but are also of such form that they aid in maintaining the roller supported end of the member 35 in the proper position with relation to the shoulder support 24, for all relative positions of the member 35 and the support 24.

While I have described several modifications of machines embodying my invention, various changes, substitutions, additions may be made in the structural features of the machine as well as the operating procedure described, without departing from the spirit of my invention as defined by the appended claims.

What I claim is:

1. A garment processing machine including a base; a support structure mounted on and extending above said base; a garment support device located on said structure above and spaced from said base; a frame secure to said structure and located between said base and said device; a pair of expander plates pivotally mounted on said frame with the plates of the pair located on opposite sides of said structure and below said support device; a separate adjuster bar pivotally secured to each plate; a pair of sleeve engaging means, each means of the pair operatively coupled to said device and to a separate one of said plates and means for simultaneously actuating said plates and said means.

2. In a garment processing machine, a collar support, a shoulder support pivotally secured thereto, an adjustable stop carried by said collar support for engaging said shoulder support and maintaining it in an extended position, and a friction roller mounted on said collar support and extending into engagement with said shoulder support.

3. In a garment processing machine, a collor support, a shoulder support pivotally secured to said collar support and movable relatively thereto from a laterally extended position to an upright position and a friction roller mounted on said collar support and engaging a plain surface of said shoulder support, and means for yieldingly pressing the peripheral surface of said roller against a surface of said member.

4. The combination of a support device including in the make-up thereof two spaced plates and an element pivotally secured to said device and movable relatively thereto about its pivotal connection therewith; a friction roller rotatively mounted on one of said plates and projecting through an aperture formed in its support plate and engaging an extended surface of said element; and means for yieldingly holding the peripheral face of said roller in engagement with the engaged surface of said element.

5. A garment processing machine, including a base; a vertically extending garment support structure located on and projecting above said base; a garment support device on said structure above and spaced from said base; oppositely disposed garment engaging elements located between said base and said device, pivotally mounted on said base and extending longitudinally of said structure; and means for periodically and simultaneously swinging said elements outwardly and inwardly about their pivot supports and relatively to said structure, including a pressure cylinder, a pressure actuated piston located within said cylinder, a piston rod secured to said piston, a crosshead secured to said rod, and two separate links, each operatively secured to said crosshead and to a separate one of said elements; a number of pins of different length; and means for supporting one such pin on a head of said cylinder in the path of travel of said crosshead to thereby limit the throw of said piston as it moves to swing said elements outwardly.

6. A garment processing machine including a base; a support structure extending upwardly from said base; a garment support device mounted on said structure above and spaced from said base; a pair of oppositely disposed, pivotally supported expander plates located on opposite sides of said structure; two pair of sleeve support members, one pair being located to engage one armhole of a garment supported on said device and the other pair being located to engage the other armhole of such garment, one member of each pair being secured to said device on one side of said structure and the other corresponding member of each pair being secured to said device on the other side of said structure with each cooperating member of each pair pivotally secured to a separate one of said plates; a separate sleeve adjuster bar pivotally secured to one of the members of each of said pairs, and means for simultaneously swinging said plates to different positions about their pivotal supports and thereby changing the relative positions of the members constituting each pair of sleeve support members.

7. In a garment processing machine, a base portion; a support structure mounted on and extending above said base portion; a shoulder support device mounted on said structure above and spaced from said base portion; a pair of expander plates located in spaced relation on opposite sides of said structure, each pivotally secured adjacent its lower end to said base portion and extending upwardly therefrom toward said device; a separate sleeve adjuster pivotally connected to each expander plate adjacent the upper end thereof; a separate sleeve support bar operatively coupled to each sleeve adjuster and to said shoulder support device; and pressure-actuated means located between said expander plates for simultaneously moving said plates about their pivot supports and each of said sleeve adjusters to different positions relatively to said support device.

8. In a garment processing machine, a base portion; a support structure mounted on and extending vertically above said base portion; a shoulder support device mounted on said structure above and spaced from said base portion; two pivotally supported expander plates located in spaced relationship one on one side of said support structure and one on the other side thereof; a separate adjuster bar pivotally secured to each expander plate; a separate sleeve support member operatively connected to each end of said support device; a separate sleeve adjuster pivotally secured to each expander plate adjacent the upper end of such plate and operatively connected to each sleeve support member; a cylinder and piston assembly located between said plates; a piston rod secured to the piston of said assembly; and means for operatively connecting said rod to each expander plate at a point intermediate the ends of such plate.

9. In a garment processing machine, a base portion; a vertically extending support structure mounted on said base portion; a collar portion mounted on said structure and spaced from said base; a separate shoulder support pivotally secured to each side of said collar portion; a separate expander plate located on each side of said support structure, each pivotally secured to said base portion and each extending upwardly toward the proximal shoulder support; a separate sleeve support member secured to and movable with and relatively to each shoulder support; a separate sleeve adjuster operatively connected to each sleeve support and pivotally connected to the proximal expander plate; and pressure-actuated means located between said plates for tilting said plates about their pivotal supports and for moving said sleeve support members and said sleeve adjusters to different positions relatively to the proximal shoulder support.

10. A garment processing machine including a base, a support structure secured to and extending above said base, a garment support device mounted on said structure above and spaced from said base and adjustable toward and away from said base; a pair of expander plates pivotally secured to said base and spaced one from the other; and means including a fluid actuated piston and cylinder assembly for swinging said expander plates to different positions about their pivotal points and relatively to said support device.

11. In a garment processing machine a base; a support structure secured to and extending above said base; a collar support secured to said structure above and spaced from said base; two shoulder supports each spaced from the other and each pivotally secured to said collar support; a friction roller mounted on and extending through an aperture formed in said collar support; and means for yieldingly pressing said roller against one of said shoulder supports.

12. In a garment processing machine a base; a support structure secured to and extending above said base; a collar support secured to said structure above and spaced from said base; two shoulder supports each spaced from the other and each pivotally secured to said collar support; a friction roller mounted on said collar support and engaging one of said shoulder supports.

13. In a garment processing machine a base; a support structure secured to and extending above said base; a collar support mounted on said structure above and spaced from said base; two shoulder supports spaced one from the other and each pivotally secured to said collar support; two expander plates spaced one from the other and each pivotally secured to said base and located below said collar support; and separate sleeve supporting means each operatively secured to a separate one of said shoulder supports and to a separate one of said expander plates.

14. In a garment processing machine a base; a support structure secured to and extending above said base; a collar support mounted on said structure above and spaced from said base; two shoulder supports spaced one from the other and each pivotally secured to said collar support; two expander plates spaced one from the other and each pivotally secured to said base; separate sleeve supporting means each pivotally secured to a separate one of said shoulder supports and to a separate one of said expander plates; and pressure actuated means operatively secured to each of said plates for tilting said plates relatively to said base and to said collar support.

15. In a garment processing machine a base; a support structure secured to and extending above said base; a collar support mounted on said structure above and spaced from said base; two shoulder supports spaced one from the other and each pivotally secured to said collar support; two expander plates spaced one from the other and each pivotally secured to said base; separate sleeve supporting means each including a sleeve support member operatively secured to a separate one of said shoulder supports; and a sleeve adjuster bar pivotally secured to a separate one of said expander plates and a separate one of said sleeve support members.

References Cited in the file of this patent

UNITED STATES PATENTS

| | | |
|---|---|---|
| 543,996 | Ligget | Apr. 6, 1895 |
| 2,114,433 | Smith | Apr. 19, 1938 |
| 2,233,492 | Sperry | Mar. 4, 1941 |
| 2,425,194 | Lendle | Aug. 5, 1947 |
| 2,679,956 | Richterkessing | June 1, 1954 |
| 2,736,471 | Jackson | Feb. 28, 1956 |
| 2,805,009 | Jackson | Sept. 3, 1957 |

FOREIGN PATENTS

| | | |
|---|---|---|
| 887,725 | France | Aug. 23, 1943 |

UNITED STATES PATENT OFFICE
CERTIFICATE OF CORRECTION

Patent No. 3,008,613                                   November 14, 1961

August F. Paris

It is hereby certified that error appears in the above numbered patent requiring correction and that the said Letters Patent should read as corrected below.

Column 1, line 22, for "reduce" read -- produce --; column 3, line 13, for "means" read -- mean --; column 4, line 63, after "(FIGURE 7)" insert -- secured --; column 5, line 56, for "plate" read -- plates --; column 6, line 39, for "aind" read -- and --; line 57, for "plataes" read -- plates --; column 9, line 30, after "rods" insert -- 60 --; line 42, for "ready" read -- readily --; column 13, line 18, for "collor" read -- collar --.

Signed and sealed this 10th day of April 1962.

(SEAL)
Attest:

ERNEST W. SWIDER                                   DAVID L. LADD
Attesting Officer                                      Commissioner of Patents